(12) United States Patent
Loboz et al.

(10) Patent No.: US 7,925,742 B2
(45) Date of Patent: Apr. 12, 2011

(54) CORRELATING PERFORMANCE DATA OF MULTIPLE COMPUTING DEVICES

(75) Inventors: Charles Z. Loboz, Redmond, WA (US); Ashley Gilbert, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/039,320

(22) Filed: Feb. 28, 2008

(65) Prior Publication Data

US 2009/0222549 A1    Sep. 3, 2009

(51) Int. Cl.
    *G06F 15/173*    (2006.01)
(52) U.S. Cl. ........................................... 709/224
(58) Field of Classification Search .......... 709/223–226; 713/401, 500–503; 702/89
    See application file for complete search history.

(56) References Cited

U.S. PATENT DOCUMENTS

| | | | |
|---|---|---|---|
| 4,980,857 A | 12/1990 | Walter | |
| 5,819,033 A * | 10/1998 | Caccavale | 709/224 |
| 5,875,320 A | 2/1999 | Gu | |
| 5,958,060 A | 9/1999 | Premerlani | |
| 6,269,401 B1 * | 7/2001 | Fletcher et al. | 709/224 |
| 6,311,175 B1 | 10/2001 | Adriaans | |
| 6,324,586 B1 | 11/2001 | Johnson | |
| 6,763,474 B1 | 7/2004 | Boerstler | |
| 7,050,420 B2 | 5/2006 | Findikli | |
| 7,134,116 B1 | 11/2006 | Thekkath | |
| 7,249,272 B1 | 7/2007 | Wardrop | |
| 2008/0294769 A1 * | 11/2008 | Doi et al. | 709/224 |

OTHER PUBLICATIONS

Catalin Dumitrescu et al., "DiPerF: an automated Distributed PERformance testing Framework," Proceedings of the Fifth IEEE/ACM International Workshop on Grid Computing (GRID '04), 8 pp.
Hlaing Minn et al, "A Combined Timing and Frequency Synchronization and Channel Estimation for OFDM," IEEE Transactions on Communications, Mar. 2006, pp. 416-422, vol. 54, No. 3.
Je Flaherty et al., "Adaptive Local Renement with Octree Load-Balancing for the Parallel Solution of Three-Dimensional Conservation Laws," pp. 1-26, Scientic Computation Research Center, Rensselaer Polytechnic Institute, Troy, New York.

* cited by examiner

*Primary Examiner* — Joseph E Avellino
*Assistant Examiner* — Chirag Patel
(74) *Attorney, Agent, or Firm* — Shook, Hardy & Bacon L.L.P.

(57) ABSTRACT

Systems, products, and methods are disclosed for facilitating the correlation of performance data associated with multiple computing devices. An illustrative method includes referencing a time as indicated by a computer and referencing a start time indication that identifies a time to begin monitoring computer performance. Thereafter, the time indicated by the computer and the start time indication are utilized to determine an initial monitoring delay. Upon determining an initial monitoring delay, an initial monitoring of the computer performance is delayed until the initial monitoring delay has lapsed. In one embodiment, computer performance data collected upon the lapse of the initial monitoring delay can be correlated with performance data associated with other computing devices.

19 Claims, 4 Drawing Sheets

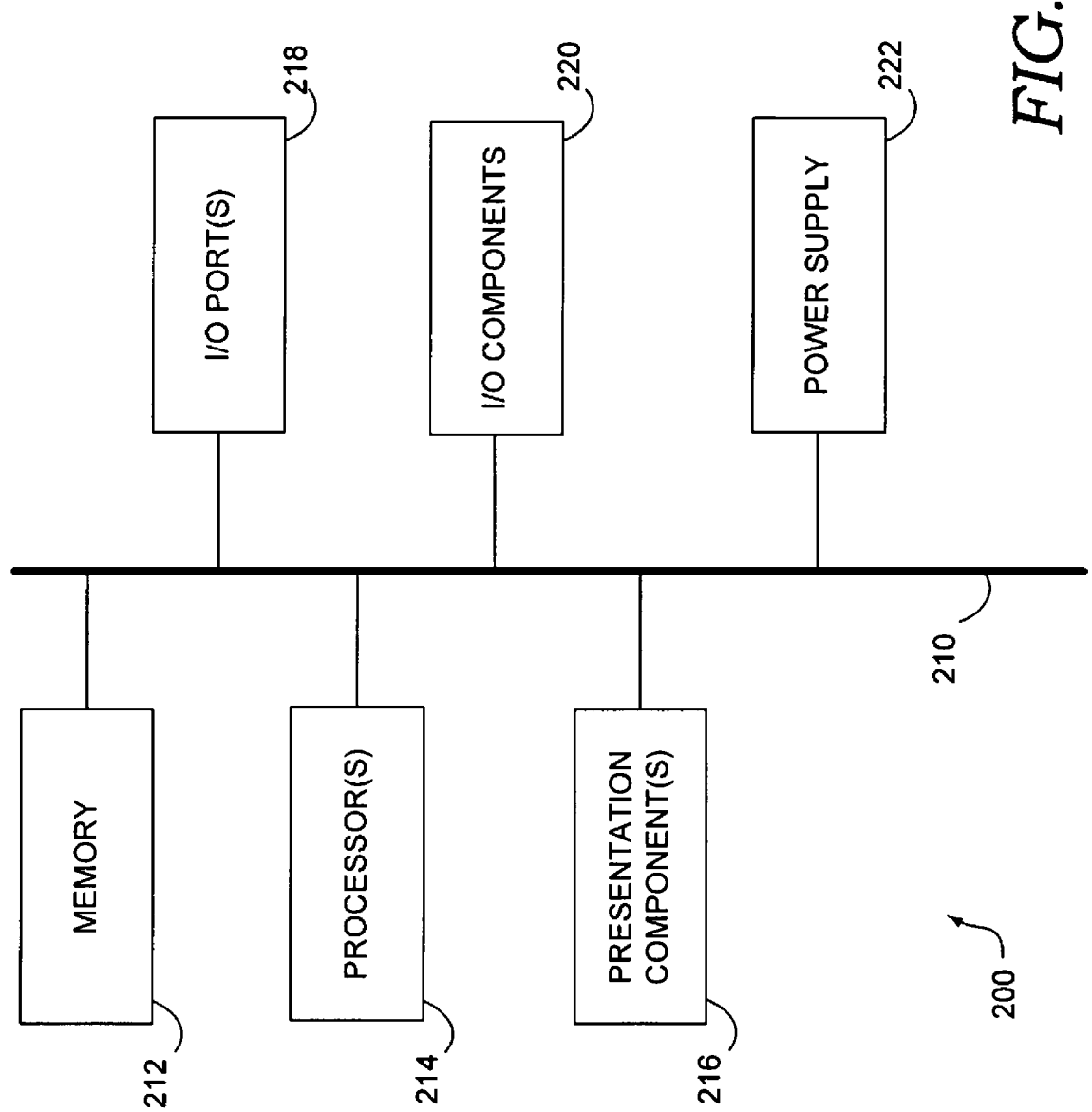

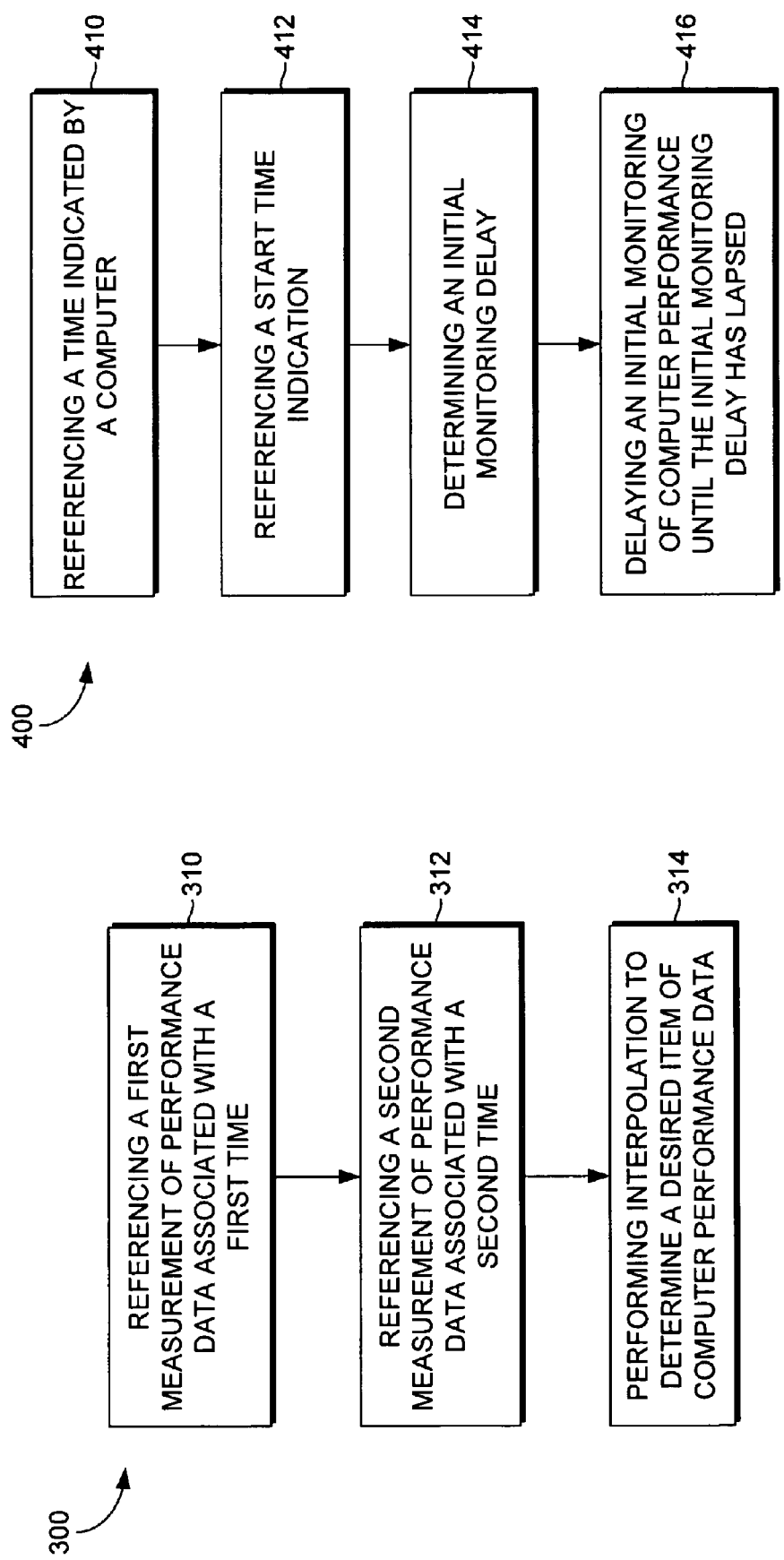

CORRELATING PERFORMANCE DATA OF MULTIPLE COMPUTING DEVICES

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. This disclosure describes new ways to obtain computer performance data that can be accurately compared with or combined with performance data collected from other computers. Generally, performance data collected at different computers at the same actual time provide more accurate results. As such, we describe utilizing interpolation to obtain performance data that corresponds with a specific time such that it correlates with performance data of other computing devices. Additionally, or alternatively, modifying a monitor so that an initial and subsequent monitoring of computer performance coincide with the monitoring of other computers can be utilized to obtain correlated performance data.

Embodiments of the present invention relate to systems, products, and methods for facilitating the correlation of performance data associated with multiple computing devices. A time as indicated by a computer and a start time indication that identifies a time to begin monitoring computer performance are referenced. Thereafter, the time indicated by the computer and the start time indication are utilized to determine an initial monitoring delay. Upon determining an initial monitoring delay, an initial monitoring of the computer performance is delayed until the initial monitoring delay has lapsed. In one embodiment, computer performance data collected upon the lapse of the initial monitoring delay can be correlated with performance data associated with other computing devices.

BRIEF DESCRIPTION OF THE DRAWINGS

Illustrative embodiments of the present invention are described in detail below with reference to the attached drawing figures, which are incorporated by reference herein and wherein:

FIG. 2 depicts a block diagram of a computing device, in accordance with an embodiment of the present invention;

FIG. 3 depicts an illustrative embodiment for utilizing interpolation to correlate performance data associated with multiple computing devices according to various embodiments of the present invention;

FIG. 4 depicts a first illustrative embodiment for utilizing an initial monitoring delay to correlate performance data associated with multiple computing devices according to various embodiments of the present invention.

DETAILED DESCRIPTION

Figure 1:
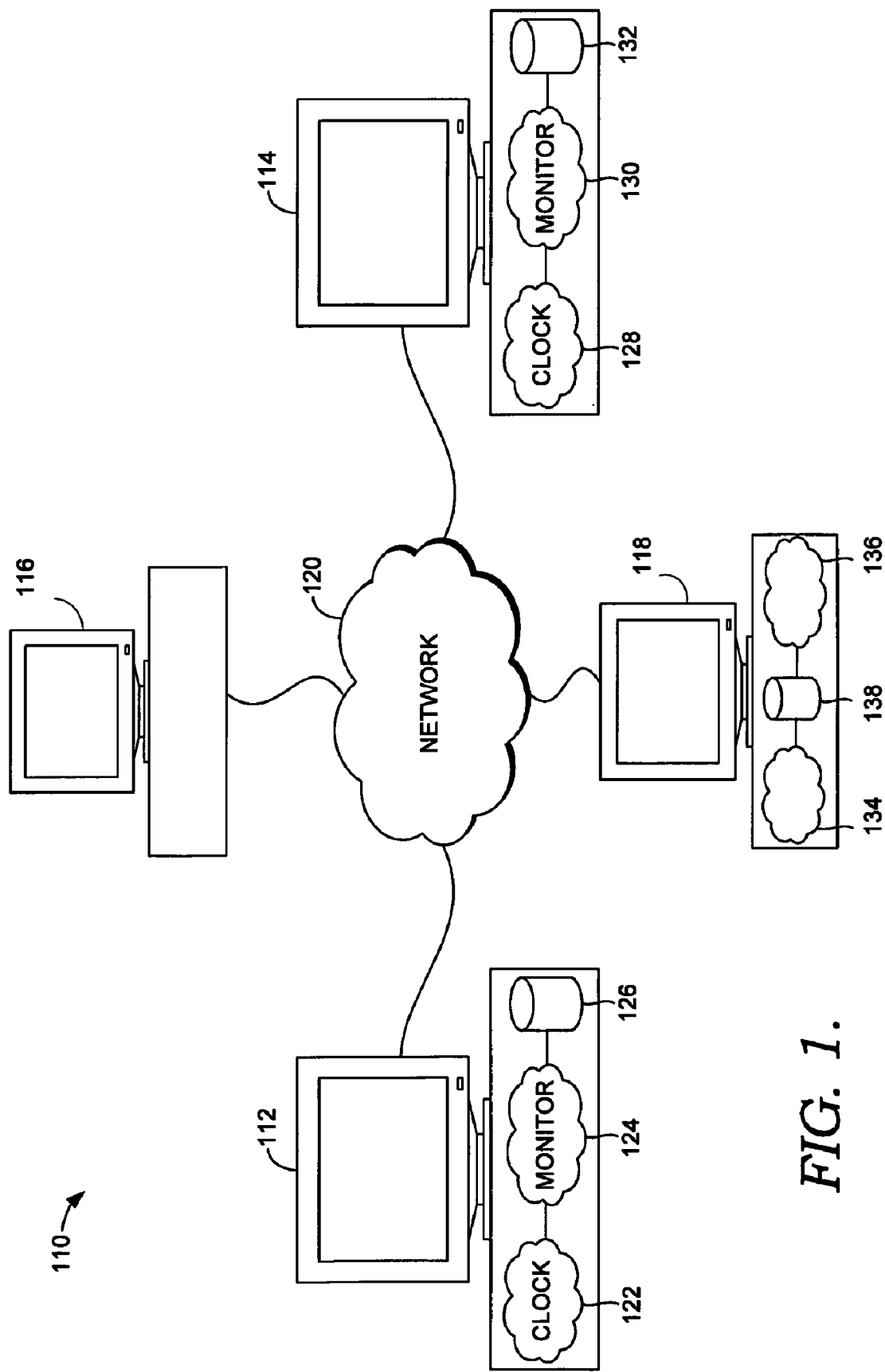
FIG. 1 depicts an illustrative computing environment suitable for practicing an embodiment of the present invention.

Turning now to FIG. 1, an illustrative computing environment suitable for practicing an embodiment of the invention is provided and referenced generally by the numeral 110. Computing environment 110 includes a first computing device 112, a second computing device 114, an independent timing source 116, an aggregating device 118, all in communication with one another via a network 120. The network 120 may include, without limitation, one or more local area networks (LANs) and/or wide area networks (WANs). Such networking environments are commonplace in offices, enterprise-wide computer networks, intranets and the Internet. Accordingly, the network 120 is not further described herein.

Each of first computing device 112, second computing device 114, independent timing source 116, and aggregating device 118 might variously be referred to as a computing device or a computer, which is schematically described in greater detail in FIG. 2. Briefly turning to FIG. 2, a diagrammatic block diagram of a computing device, such as, for example, first computing device 112, second computing device 114, independent timing source 116, and/or aggregating device 118, is provided. First computing device 112, second computing device 114, independent timing source 116, and/or aggregating device 118 may take on a variety of forms, including, for example, a computing device such as a client computer, a server computer, the variations thereof such as laptop computers and palm-top computers, and in some embodiments devices such as PDAs and smart phones. As shown in FIG. 2, a bus 210 couples one or more memory components 212 to one or more processors 214, various presentation components 216, input/output ports 218, input/output components 220, and at least one power supply 222. Other devices including lower level aspects of the shown devices are not shown so as to not obscure the invention.

Memory components 212 include things such as a hard drive, volatile memory (such as RAM), buffers, and the like. The one or more processors 214 control overall data communications throughout computer 212. Illustrative presentation components 216 include a video card as well as a monitor or other presentation device. Input/output ports 218 provide connectivity to peripheral components such as printers, digital cameras, and the like. Actual input/output components may be things like printers and the like. A power supply 222 provides power to run a computing device. Not all of the components shown in FIG. 2 need to be present in order to make up a computing device but are shown for illustrative purposes in connection with describing an embodiment of the invention.

Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 2 is merely illustrative of an exemplary computing device that can be used in connection with one or more embodiments of the present invention.

First computing device 112, second computing device 114, independent timing source 116, and/or aggregating device 118 typically include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave, or any other medium that can be used to encode desired information and be accessed by the computing device.

Returning now to FIG. 1, computing environment 110 indicates that first computing device 112 includes a clock 122, a monitor 124, and a data store 126. Similarly, second computing device 114 includes a clock 128, a monitor 130, and a data store 132. Clock 122 and clock 128 provide an indication of the time as represented within the respective computing device. Time can be measured utilizing any measurement system. In one embodiment, time is measured by a count of the number of ticks (e.g., seconds, nanoseconds, millisecond, and the like) that have transpired after a predetermined start point. Time can also be represented as a calendar time including, for example, year, month, day of month, hour, minute, second, portion of a second, time zone, and the like. For example, clock 122 can provide an indication of a time as represented within first computing device 112 of 12:00:00 PM CST on Jan. 1, 2008. Such a time, or portion thereof, can be presented via a user interface.

In embodiments, clocks 122 and 128 are capable of communicating with independent timing source 116 to enable clock synchronization. Clock synchronization is utilized to coordinate computer clocks that indicate different times. In embodiments, clocks may indicate different times based on, for example, varied initial settings or clock drift (e.g., measuring time using different rates). Accordingly, clock synchronization allows clock 122 and clock 128 to indicate the same time. As used herein, the same time refers to a time that is identical to or substantially the same as at least one other time.

As indicated in FIG. 1, clocks 122 and 128 can be synchronized utilizing independent timing source 116. Independent timing source 116, as used herein, refers to a source that provides a time to which a plurality of computer clocks can reference for synchronization. In one embodiment, independent timing source 116 is a time server (e.g., a local network time server, an internet time server, or the like) that obtains the actual time from a reference clock (not shown) or another time server (not shown) and communicates, via network 120, the time to first and second computing devices 112 and 114. In such an embodiment, network time protocol (NTP) can be used for synchronizing computer clocks. The reference clock from which the actual time is obtained can be a clock associated with another time server on a network, an atomic clock, a global positioning system (GPS) clock, a radio clock, or the like.

In another embodiment, independent timing source 116 is a centralized server having a clock. In such an embodiment, each of clocks 122 and 128 synchronize with the time as indicated on the centralized server. Although FIG. 1 depicts first and second computing devices 112 and 114 as communicating with independent timing source 116 via network 120, embodiments are not limited as such. For example, first and second computing devices 112 and 114 can communicate directly with an independent timing source, such as an atomic clock, a GPS clock, or any other radio clock.

This invention contemplates that any method can be employed for clock synchronization. In one embodiment, clocks 122 and 128 can be synchronized without utilizing independent timing source 116. For example, first computing device 112 and second computing device 114 can utilize clock sampling mutual network synchronization. With clock sampling mutual network synchronization, a master or reference clock is not utilized. Rather, clocks 122 and 128 both contribute to clock synchronization.

Monitor 124 and monitor 130 monitor computer performance and collect performance data associated with first computing device 112 and second computing device 114, respectively. Performance data, as used herein, refers to any data that indicates the performance of a computing device associated therewith. Such performance data can relate to, for example, computer load, utilization, operational characteristics, and any other computer performance. In embodiments, monitors 124 and 130 obtain performance data upon a lapse of a time interval.

Data store 126 and data store 132 can also be included as part of first and second computing devices 112 and 114, respectively. Although data stores 126 and 132 are depicted separately from monitors 124 and 130 in FIG. 1, respectively, in one embodiment, monitors and data stores can be combined into a single component. Data stores 126 and 132 can respectively be utilized to store performance data collected by monitors 124 and 130. In such an embodiment, data stores 126 and 132 might also store the time at which the performance data was collected.

As indicated in FIG. 1, first computing device 112 and second computing device 114 are capable of communicating with aggregating device 118. In one embodiment, aggregating device 118 includes a performance data aggregator 134, an interpolator 136, and a data store 138. Performance data aggregator 134 aggregates performance data collected by first computing device 112 and second computing device 114. Aggregated performance data enables measurement and analysis of the performance of a group of computers as well as the ability to compare performance data of a plurality of computers with respect to a specific time. As such, the system behavior or state of multiple computers at a specific time can be measured, analyzed, and/or compared. Such information can be used, for example, for load balancing and other usage optimizations. In embodiments, the more correlated or synchronized the performance data of each computing device is with respect to one another, the more accurate the measurement, comparison, and/or analysis of the system behavior of multiple computers.

In one embodiment, performance data aggregator 134 measures, analyzes, summarizes, and/or compares the performance data associated with multiple computers to obtain, for example, information regarding utilization, overload, under load, and other characteristics. Such measurements, analysis, summarization, and/or comparison can alternatively be performed by a separate application (not shown) running on aggregating device 118 or an application running on a separate computing device (not shown).

In one embodiment, an interpolator 136 can be utilized to determine performance data corresponding to a desired time by using other performance data collected by a monitor. Interpolator 136 can be used to estimate performance data associated with a desired time or a desired time duration. In embodiments, any method of interpolation can be used, such as, for example, linear interpolation, polynomial interpolation, and the like.

By way of example only, performance data aggregator 134 may obtain performance data with respect to first computing device 112. Assume that performance data corresponding to 12:00:00 is desired, but only has data collected that corresponds with 11:59:95 and 12:00:05. In such a case, interpolator 136 can be used to estimate performance data corresponding to 12:00:00 (i.e., the desired time). In one embodiment, interpolator 136 might be implemented into the first computing device 112 and/or second computing device 114 such that desired performance data could be estimated using interpolation and, thereafter, communicated to aggregating device 118.

Data store 138 can also be included as part of aggregating device 118. Although data store 138 is depicted separately from performance data aggregator 134 and interpolator 136, in one embodiment, data store 138 can be combined with performance data aggregator 134 and/or interpolator 136 into a single component. Data store 138 can be utilized to store performance data; aggregated performance data; performance data measurements, analysis, summarizations, and/or comparisons; interpolated data, and the like. In such an embodiment, data store 138 might also store a time associated with data stored therein.

By way of example only, assume that monitor 124 of first computing device 112 collects a computer utilization of 0% at 11:59:00 and a computer utilization of 50% at 12:01:00, in accordance with clock 122 that is synchronized using independent timing source 116. Further assume that monitor 130 of second computing device 114 collects a computer utilization of 75% at 12:00:00 and a computer utilization of 25% at 12:02:00, in accordance with clock 128 that is synchronized using independent timing source 116. The computer utilizations associated with first computing device 112 and second computing device 114 are communicated to aggregating device 118. Assuming a system utilization (e.g., average utilization of first and second computing devices 112 and 114) for 12:00:00 is desired, interpolator 136 can interpolate the performance data associated with first computing device 112 (i.e., 0% utilization at 11:59:00 and 50% utilization at 12:01:00) to estimate a first computing device 112 utilization of 25% at 12:00:00. Using the interpolated data, the system utilization, or portion thereof, at 12:00:00 can be calculated to be 50% (i.e., the average of the estimated utilization of 25% for first computing device 112 and the collected utilization of 75% for second computing device 114).

Computing environment 110 is merely an example. Although FIG. 1 includes only first computing device 112 and second computing device 114 for which performance data is monitored collected, any number of computing devices and monitors may be utilized to collect performance data. For example, 500 computing devices, such as servers, can be in communication with one or more independent time sources and/or one or more aggregating devices. In such a case, performance data corresponding with a specific time can be aggregated, measured, analyzed, summarized, and/or compared for the 500 computing devices. The single-unit depictions are meant for clarity, not to limit the scope of embodiments in any form. In addition, any combination of components is contemplated to be within the scope of this invention. For example, each computing device, or a portion thereof, for which computer performance is monitored can have an interpolator and/or performance data aggregator.

As previously mentioned in the Summary, embodiments of the present invention enable correlating performance data of multiple computing devices. Correlated performance data refers to performance data that is associated with the same time or same time duration. Correlated performance data can be utilized to more accurately compare performance data of multiple computing devices or to measure, analyze, or summarize a system state of multiple computing devices. Monitors oftentimes collect performance data at times that vary from one another, even if the monitors base performance data collection using the same requested interval (i.e., a desired time interval after which performance data is to be collected). For example, assume a first computing device is initialized (e.g., system boot-up is complete) at 11:59:00 and the first computing device collects data initially and after a requested interval of 60 seconds thereafter. As such, the first computing device collects data at 11:59:00, 12:00:00, 12:00:01, and so on. Further assume that a second computing device is initialized at 11:59:30 and, similar to the first computing device, collects data initially and after a requested interval of 60 seconds thereafter. Even though the same requested interval is utilized for collected data (i.e., 60 seconds), the computing devices collect performance data at different times. Because the performance data are not correlated (e.g., collected and/or monitored at the same), it is difficult to accurately compare, measure, analyze, and/or summarize the collected performance data.

An embodiment of the present invention enables correlating performance data of multiple computing devices. Stated differently, performance data associated with a computing device is obtained such that it can be correlated with performance data of another computing device. With reference to FIG. 3, an illustrative method for utilizing interpolation to correlate performance data associated with multiple computing devices will be described. As discussed hereinabove, interpolation can be utilized to estimate performance data corresponding to a desired time or time duration. In one embodiment, the desired time might correspond to a time or time duration for which performance data of another computer is associated. Alternatively, the desired time or time duration might correspond to a time or duration utilized by a device, such as aggregating device 118 of FIG. 1, to aggregate, summarize, measure, analyze, and/or compare performance data. Such a desired time or time duration might be based on user input from, for example, a system administrator.

At step 310, a first measurement of performance data associated with a first time is referenced. At step 312, a second measurement of performance data associated with a second time is referenced. In embodiments, the first measurement of performance data and the second measurement of performance data are associated with a particular computing device. Interpolation is performed at step 314 to determine (e.g., estimate) a desired item of computer performance data corresponding with a desired time or time duration. Such a desired item of computer performance data can be related to any performance data including, for example, computer load, utilization, operational characteristics, and any other computer performance. After determining the desired item of computer performance data, the desired item of computer performance data can be compared with other performance data that corresponds with the desired time or time duration. Alternatively or additionally, the desired item of computer performance data can be used in measuring, analyzing, and/or summarizing a system state of multiple computers for the desired time or time duration.

Embodiments are not limited to utilizing two measurements of performance data to estimate a desired item of computer performance data. Rather, any number of performance data measurements can be used in performing interpolation. In embodiments, a determination as to the measurements of performance data to utilize in performing interpolation might be made. Such a determination can be made, for example, by interpolator 136 of FIG. 1 or by another component that can communicate the determination and/or the performance data measurements to interpolator 136 of FIG. 1. In one embodiment, such a determination can be made using, for example, interpolation reference parameters, an algorithm, or a lookup table. Interpolation reference parameters might indicate a number of performance data measurements to utilize (e.g., 10 measurements), a number of performance data measurements collected before and/or after the desired time or time duration (e.g., 5 measurements before and 5 measurements after the desired time of 12:00:00), a time frame for which performance data measurements should be utilized (e.g., measurements within 10 minutes of the desired time), and the like.

By way of example only, assume that computer utilization at 12:00:00 is desired such that a set of correlated computer utilizations can be compared, measured, summarized, and/or analyzed. Further assume that a monitor of a first computing device collects a computer utilization of 0% at 11:59:00 and a computer utilization of 50% at 12:01:00. Each of the 0% utilization at 11:59:00 and the 50% utilization at 12:01:00 are referenced. Interpolation is then performed to estimate a 25% utilization at 12:00:00. Similarly, assume that a monitor of a second computing device collects a computer utilization of 75% at 11:58:00 and a computer utilization of 25% at 12:02:00. Each of the 75% at 11:58:00 and the 25% utilization at 12:02:00 are referenced. Thereafter, interpolation is performed to estimate a 50% utilization at 12:00:00. After interpolation is performed to obtain an estimated computer utilization for 12:00 for each computing device, the first and second computing devices have correlated computer utilizations (i.e., 25% utilization associated with the first computing device and 50% utilization associated with the second computing device) that can be compared, measured, summarized and/or analyzed.

Turning now to FIG. 4, an illustrative method for utilizing an initial monitoring delay to correlate performance data associated with multiple computing devices will be described. Initially, as indicated at step 410, a time indicated by a computer is referenced. In embodiments, the time indicated by the computer is the same time as the time indicated by an independent timing source. Such a time synchronization enables performance data associated with multiple computing devices to be correlated. As discussed more fully above, the independent timing source can be, for example, a time server, a clock (e.g. atomic clock, a GPS clock, or a radio clock), or a centralized server.

At step 412, a start time indication is referenced. A start time indication refers to an indication of a time that a monitor is to begin monitoring and/or collecting data. For example, a start time indication might indicate that the monitor should begin monitoring and/or collecting data at 12:00:00 PM. A start time indication can be provided within a set of attributes associated with a computer and/or monitor. Such attributes may include, for example, a data collection attribute (i.e., an indication of data to collect); a storage location attribute (i.e., an indication of a storage location of the collected data); a requested interval attribute (i.e., an indication of a requested interval, that is, a desired time interval after which performance data is to be monitored and/or collected), a start time attribute (i.e., an indication of a time to begin monitoring), and the like. Alternatively, a start time indication can be identified, as more fully discussed below, and thereafter utilized.

At step 414, an initial monitor delay is determined. An initial monitor delay, as used herein, refers to the initial time duration that the monitor is requested to delay until collecting and/or monitoring data for the first time after computer initialization (e.g., boot-up). In one embodiment, an initial monitor delay is determined based on the time indicated by the computer and the start time indication. In such an embodiment, the initial monitor delay might be the difference between the time indicated by the computer and the start time indication. For example, assume that the time indicated by the computer is 11:59:45 and that the start time indication identifies 12:00:00 as the time to begin monitoring computer performance and/or collecting performance data. In such a case, the initial monitor delay equals fifteen seconds (i.e., the time difference between the start time indication and the time indicated by the computer).

At step 416, an initial monitoring of computer performance is delayed until the initial monitoring delay has lapsed. In one embodiment, the monitor sleeps for the duration of the initial monitoring delay (e.g., fifteen seconds) and, upon the lapse of the initial monitoring delay, the monitor monitors the computer performance and/or collects data.

Figure 5:
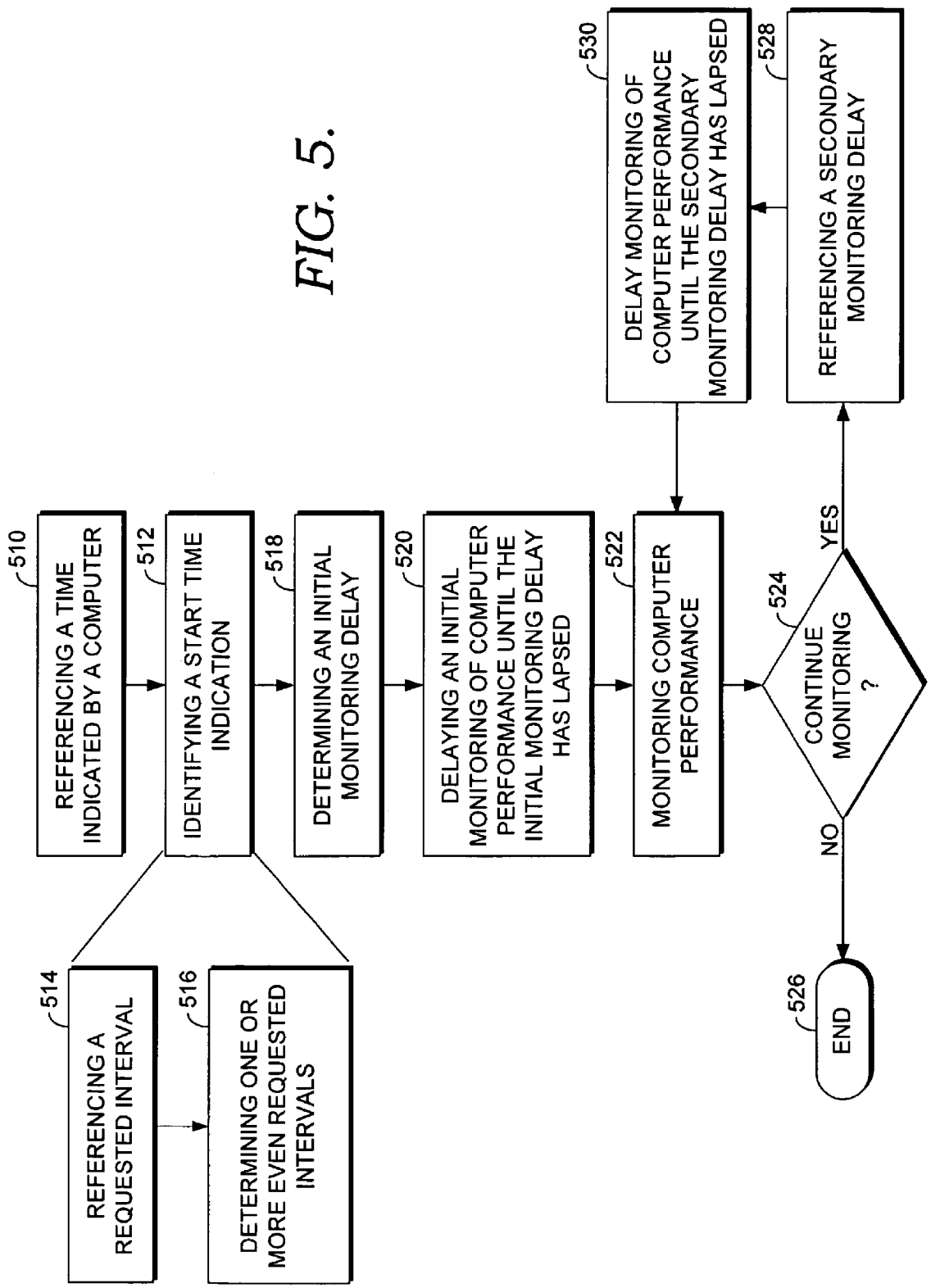
FIG. 5 depicts a second illustrative embodiment for utilizing an initial monitoring delay to correlate performance data associated with multiple computing devices according to various embodiments of the present invention.

With reference to FIG. 5, an illustrative method for utilizing an initial monitoring delay to correlate performance data associated with multiple computing devices will be described. Initially, as indicated at step 510, a time indicated by a computing device is referenced. The time indicated by the computing device might be the current time as represented by the computing device. In embodiments, the time indicated by the computer might be the same as a time indicated by an independent timing source or another computing device. Such a time synchronization enables performance data associated with multiple computing devices to be correlated.

At step 512, a start time indication is identified. In one embodiment, a start time indication can be identified by referencing a start time attribute that provides an indication of a time to begin monitoring (e.g., 12:00:00) associated with a computer and/or monitor. In another embodiment, a start time indication can be identified upon referencing a requested interval that indicates a desired time interval after which performance data is to be monitored and/or collected. For example, a requested interval can be 15 seconds, 5 milliseconds, or any other time duration. In such an embodiment, as shown in FIG. 5, at step 514, a requested interval is referenced. Such a requested interval might be set forth as a requested interval attribute associated with a computing device and/or monitor. In some cases, an initial requested interval might indicate a time interval after which performance data is to be initially collected and/or monitored while a secondary requested interval might indicate a time interval after which performance data is to be subsequently collected and/or monitored. That is, the initial requested interval might be used in determining an initial monitoring delay and the secondary requested interval might be used to identify a secondary monitoring delay, as discussed more fully below.

Subsequently, at step 516, one or more even requested intervals are determined. An even requested interval, as used herein, refers to any multiple of the requested interval, or a variation thereof. For example, assume a requested interval equals 5 seconds. In such a case, even requested intervals include 5 seconds after a minute, 10 seconds after a minute, 15 seconds after a minute, and the like. By way of further example, assume a requested interval equals 15 seconds. In such a case, even requested intervals include 15, 30, 45, and 60 seconds after each minute.

In some embodiments, an even requested interval can equal a time shift applied to a multiple of the requested interval. Such a time shift applied to a multiple of a requested interval can enhance computing device and/or monitor efficiency. For example, such a time shift can, in effect, avoid data collection that begins at even hours, minutes, seconds, and the like, to reduce conflicts with other scheduled computer tasks. By way of example, assume a referenced requested interval equals 15 seconds. Further assume that a time shift of two seconds is desired. In such a case, multiples of the requested interval include 15, 30, 45, and 60 seconds after a minute. Upon applying the desired time shift of two seconds to the requested interval multiples, the resulting even requested intervals include 2, 17, 32, and 47 seconds after a minute.

After determining one or more even requested intervals at step 516, a start time indication can be identified at step 512. In one embodiment, the start time indication might equal a first even requested interval that will occur after the time indicated by the computer. For example, assume even requested intervals are determined to be 15, 30, 45, and 60 seconds after a minute and that the time indicated by a computer is 12:00:47. In such a case, a first even requested interval that will occur after the time indicated by the computer is 12:01:00. Accordingly, the start time indication equals 12:01:00.

After the start time indication is identified, an initial monitoring delay is determined. This is indicated at step 518. In one embodiment, an initial monitoring delay is determined based on the time indicated by the computer and the start time indication. In such an embodiment, initial monitor delay can be the difference between the time indicated by the computer and the start time indication.

At step 520, an initial monitoring of computer performance is delayed until the initial monitoring delay has lapsed. In one embodiment, the monitor sleeps for the duration of the initial monitoring delay (e.g., fifteen seconds) and, upon the lapse of the initial monitoring delay, the monitor monitors the computer performance and/or collects data.

Computer performance is monitored at step 522. In embodiments, performance data is collected in accordance with monitoring the computer performance. At step 524, it is determined if monitoring computer performance is to continue. If it is determined that monitoring computer performance is not to continue, the method ends at step 526. If, however, it is determined that monitoring computer performance is to continue, a secondary monitoring delay is referenced at step 528.

A secondary monitor delay, as used herein, refers to a time duration that the monitor is requested to delay until collecting and/or monitoring data subsequent to the initial collection and/or monitoring of data. In one embodiment, a secondary monitor delay equals a secondary requested interval that indicates a desired time interval after which performance data is to be collected. In such an embodiment, the monitoring of computer performance occurs after the delay of the secondary requested interval for each monitoring iteration after the initial monitoring of computer performance. In some cases, the secondary requested interval might equal an initial requested interval. As such, a single requested interval can be used to represent a requested interval for both the initial monitoring and subsequent monitoring.

In embodiments, small delays in sampling time can occur. For example, when a monitor is set to monitor computer performance upon the lapse of a requested interval, the actual monitoring and/or collecting time can be slightly later than the end of the requested interval due to delays, such as processing delays and monitoring delays. Therefore, although a computing device may begin monitoring computer performance at a specific time, the actual duration at which a computer performance is monitored can be varied from the requested interval. For example, assume that a monitor begins monitoring computer performance at 12:00:00 and a secondary requested interval indicates that monitoring is desired to occur at five second intervals. After the initial monitoring, the monitor collects data at 12:00:05 and, after delaying for a five second duration, the monitor should collect data again at 12:00:10. Assume that the monitor, however, is delayed for two seconds due to the processing. In such a case, the monitor does not collect data until 12:00:12 and then delays for a five second duration. As can be recognized, the monitor no longer collects data at even requested intervals (e.g., 12:00:05, 12:00:10, 12:00:15, and the like). Rather, data is collected at various times and the actual delay between collection times can vary.

As such, in an alternative embodiment, a secondary monitor delay for which the monitor is requested to delay can be based on a requested interval (e.g., a secondary requested interval), which indicates a desired time duration after which performance data is to be collected, and a monitoring adjustment. The monitoring adjustment can be based on one or more previous delays, such as processing or monitoring delays, that resulted in the previous monitoring to occur after the requested interval. Accordingly, in one embodiment, the secondary monitor delay might equal the requested interval plus or minus a monitoring adjustment to accommodate for the additional delays. In such an embodiment, the secondary monitor delay might be dynamically determined for each iteration following the initial monitoring of computer performance. Methods for determining the secondary monitoring delay are discussed in the nonprovisional application entitled "Accurate Measurement and Monitoring of Computer Systems," U.S. patent application Ser. No. 11/972,624, filed on Jan. 11, 2008, and commonly assigned to the assignee of the present invention, which is hereby incorporated by reference to explain overcoming monitoring and/or collecting delays such that computing devices can be accurately measured and monitored.

Based on the referenced secondary monitoring delay, the monitoring of computer performance is delayed until the secondary monitoring delay has lapsed. This is indicated at step 530. In one embodiment, the monitor sleeps for the duration of the secondary monitoring delay and, upon lapse of the secondary monitoring delay, the computer performance is monitored and/or performance data is collected. Upon the lapse of the secondary monitoring delay, the method returns to step 522 such that the computer performance is monitored. The method continues reiterating step 522 through step 530 until it is determined, at step 524, that monitoring should be discontinued.

By way of example only, assume a time as indicated by a first computer is 12:00:17 and a requested interval equals 15 seconds. Further assume that the requested interval applies to both an initial monitoring of computer performance and subsequent monitoring of computer performance (e.g., the initial requested interval and secondary requested interval are equal or only one requested interval is indicated). Upon referencing the requested interval equal to 15 seconds, a first even requested interval occurring after the time indicated by the first computer (e.g., 12:00:17) is determined to equal 30 seconds. Accordingly, the start time indication is identified as 12:00:30. Utilizing the start time indication (i.e., 12:00:30) and the time indicated by the first computer (i.e., 12:00:17), an initial monitoring delay of 13 seconds is determined. As such, the initial monitoring of computer performance is delayed for 13 seconds. Upon the lapse of 13 seconds, the computer performance is monitored and/or performance data is collected, which occurs at about 12:00:30. Subsequently, a secondary monitoring delay that indicates the secondary delay of computer performance monitoring is referenced. In one embodiment, the secondary monitoring delay may be based on monitoring adjustments made to the requested interval (e.g., 15 seconds) to account for variations in actual monitoring delays. Upon referencing the secondary monitoring delay, the monitoring of computer performance is delayed until the secondary monitoring delay has lapsed and, thereafter, computer performance is monitored, which occurs at about 12:00:45.

Now assume that a time as indicated by a second computer is 12:00:29 and a requested interval equals 15 seconds. Further assume that the requested interval applies to both an initial monitoring of computer performance and subsequent monitoring of computer performance. Upon referencing the requested interval equal to 15 seconds, a first even requested interval occurring after the time indicated by the second computer (i.e., 12:00:29) is determined to equal 30 seconds. Accordingly, the start time indication is identified as 12:00:30. Utilizing the start time indication (i.e., 12:00:30) and the time indicated by the second computer (i.e., 12:00:29), an initial monitoring delay of one second is determined. As such, the initial monitoring of computer performance is delayed for one second. Upon the lapse of one second, the computer performance is monitored and/or performance data is collected, which occurs at about 12:00:30. Subsequently, a secondary monitoring delay that indicates the secondary delay of computer performance monitoring is referenced. In one embodiment, the secondary monitoring delay may be based on adjustments made to the requested interval (e.g., 15 seconds) to account for variations in actual monitoring delays. Upon referencing the secondary monitoring delay, the monitoring of computer performance is delayed until the secondary monitoring delay has lapsed and, thereafter, computer performance is monitored, which occurs at about 12:00:45.

Accordingly, both the first and second computers have collected data at about 12:00:30 and 12:00:45. Such correlated performance data can be utilized to measure, compare, analyze, summarize, or aggregate the performance data. In addition, in some embodiments, interpolation as described with respect to FIG. 3, can be utilized to further obtain correlated performance data. For example, even though both the first and second computer collected data at about the same times, a small deviation in times can still exist. As such, interpolation can be used to estimate the performance data associated with 12:00:30 and 12:00:45.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of obtaining computer performance data associated with a computer that can be correlated with performance data of another computer, the method comprising:
referencing a requested interval that indicates a desired time interval after which performance data is to be monitored, collected, or a combination thereof;
determining one or more even requested intervals for the requested interval, each even requested interval comprising a multiple of the requested interval;
identifying a first even requested interval to occur after a time indicated by the computer;
delaying an initial monitoring of computer performance of said computer until an occurrence of the first even requested interval; and
delaying a secondary monitoring of computer performance of said computer until an occurrence of a second even requested interval occurring after the first even requested interval.

2. The media of claim 1, wherein the requested interval comprises an initial requested interval.

3. The media of claim 1 further comprising monitoring said computer performance to obtain first performance data associated with said computer.

4. The media of claim 3 further comprising:
monitoring said computer performance to obtain second performance data associated with said computer.

5. The media of claim 3 further comprising storing the first performance data.

6. The media of claim 4 further comprising storing the second performance data.

7. The media of claim 4 further comprising communicating the first performance data and the second performance data to a performance data aggregator.

8. The media of claim 4 further comprising performing interpolation based on the first performance data and the second performance data to determine a desired item of computer performance data corresponding to a desired data-collection time.

9. The media of claim 4, wherein the first performance data and the second performance data comprise a load data, a utilization data, an operational data, or a combination thereof.

10. A computer system for obtaining computer performance data associated with a computer that can be correlated with performance data of another computer, the system comprising:
a first computer having a processing unit and a memory for storing computer-executable instructions that when executed by the processing unit executes:
referencing a requested interval that indicates a desired time interval after which performance data is to be monitored, collected, or a combination thereof;
determining one or more even requested intervals for the requested interval, each even requested interval comprising a multiple of the requested interval;
identifying a first even requested interval to occur after a time indicated by the first computer;
delaying an initial monitoring of computer performance of said first computer until an occurrence of the first even requested interval; and
delaying a secondary monitoring of computer performance of said first computer until an occurrence of a second even requested interval occurring after the first even requested interval.

11. The system of claim 10 further comprising
monitoring said computer performance to obtain first performance data associated with said first computer at the occurrence of the second even requested interval.

12. The system of claim 11 further comprising a second computer that monitors a computer performance to obtain second performance data associated with said second computer at an occurrence that matches the second even requested interval.

13. The system of claim 12 further comprising an aggregator that aggregates the first performance data associated with said first computer and the second performance data associated with said second computer.

14. The system of claim 13, wherein the aggregator compares, analyzes, or summarizes the first performance data associated with said first computer and the second performance data associated with said second computer.

15. A method in a computer system for obtaining computer performance data associated with a first computer that can be correlated with performance data of a second computer, the method comprising:
- referencing a requested interval that indicates a desired time interval after which performance data is to be monitored, collected, or a combination thereof;
- determining one or more even requested intervals for the requested interval, each even requested interval comprising a multiple of the requested interval;
- identifying a first even requested interval to occur after a time indicated by the first computer;
- delaying an initial monitoring of computer performance of said first computer until an occurrence of the first even requested interval; and
- delaying a secondary monitoring of computer performance of said first computer until an occurrence of a second even requested interval occurring after the first even requested interval.

16. The method of claim 15 further comprising collecting performance data after the occurrence of the first even requested interval.

17. The method of claim 16 further comprising utilizing the performance data to compare, analyze, aggregate, or summarize, in accordance with correlated performance data of the second computer.

18. The method of claim 15 further comprising:
- monitoring said computer performance to obtain first performance data associated with said first computer; and
- monitoring said computer performance to obtain second performance data associated with said first computer.

19. The method of claim 18 further comprising performing interpolation based on the first performance data and the second performance data to determine a desired item of computer performance data corresponding to a desired data-collection time.

* * * * *